(12) United States Patent
Pandit et al.

(10) Patent No.: US 7,248,691 B1
(45) Date of Patent: Jul. 24, 2007

(54) HASHING USING MULTIPLE SUB-HASHES

(75) Inventors: Bhalchandra S. Pandit, Redmond, WA (US); Robert P. Reichel, Redmond, WA (US); Jeffrey B. Hamblin, Redmond, WA (US); Kedarnath A. Dubhashi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1203 days.

(21) Appl. No.: 09/704,186

(22) Filed: Oct. 31, 2000

(51) Int. Cl.
*H04K 1/00* (2006.01)
*H04L 9/00* (2006.01)
(52) U.S. Cl. .............. 380/28; 380/44; 380/47; 380/273; 380/286; 713/164; 713/165; 713/167; 713/168; 713/180
(58) Field of Classification Search .......... 713/200, 713/201, 164, 165, 167, 168, 180; 380/28, 380/277, 278, 44, 273, 47, 286; 707/3–6, 707/103 Y, 103 X, 103 Z
See application file for complete search history.

(56) References Cited

U.S. PATENT DOCUMENTS

| | | | | |
|---|---|---|---|---|
| 5,742,807 A | * | 4/1998 | Masinter | 707/1 |
| 5,852,821 A | * | 12/1998 | Chen et al. | 707/2 |
| 5,852,822 A | * | 12/1998 | Srinivasan et al. | 707/4 |
| 6,424,650 B1 | * | 7/2002 | Yang et al. | 370/390 |
| 6,505,191 B1 | * | 1/2003 | Baclawski | 707/3 |

OTHER PUBLICATIONS

Cadence Design Systems, Inc. Leapfrog VHDL Simulator: A Complete VHDL Solution. Copyright 1997-2000, Actel Corporation, Sunnyvale, CA 94086-4533. pp. 1-4.
Candence Design System, Inc. Datasheeet: Leapfrog VHDL Simulator. pp. 1-8. Copyright 1997.

* cited by examiner

*Primary Examiner*—Kim Vu
*Assistant Examiner*—Beemnet W Dada
(74) *Attorney, Agent, or Firm*—Lee & Hayes, PLLC

(57) ABSTRACT

A hashing structure including multiple sub-hashes is used to determine whether an input value matches one or more of multiple target values. These values can be of any form, such as security identifiers in an access control system. To make the determination, a hash key is obtained from the input value and multiple sub-hash indexes (one for each of the multiple sub-hashes) are generated based on the key. Values are identified from the multiple sub-hashes by indexing into the sub-hashes using respective ones of the sub-hash indexes. These values are then combined to generate a resultant hash value. Each of the multiple target values corresponds to one of multiple portions of the resultant hash value. If the portion corresponding to one of the target values has a particular value, then that target value is a likely match and is compared to the input value to determine if indeed the two match. This comparison can then be repeated for each target value with a corresponding portion in the resultant hash value that has the particular value.

38 Claims, 9 Drawing Sheets

Security Token SIDs 136

| |
|---|
| s-0x1-000000000005-15-17b85159-255d7266-b3b6364-201 |
| s-0x1-000000000001-0 |
| s-0x1-000000000005-20-221 |
| s-0x1-000000000005-15-2e1b30b9-6c4c41b7-15353b8-2cb997 |
| s-0x1-000000000005-15-17b85159-255d7266-b3b6364-2cb997 |
| s-0x1-000000000005-15-17b85159-255d7266-b3b6364-2c34d8 |
| s-0x1-000000000005-15-17b85159-255d7266-b3b6364-2cb998 |
| s-0x1-000000000005-15-17b85159-255d7266-b3b6364-18a99 |
| s-0x1-000000000005-15-17b85159-255d7266-b3b6364-2cb9dd |

182 — row 3
184 — row 4

Access Control SIDs 132

180 —

| |
|---|
| s-0x1-000000000005-15-17b85159-255d7266-b3b6364-2cb997 |
| s-0x1-000000000005-15-17b85159-255d7266-b3b6364-2ccfc5 |
| s-0x1-000000000005-15-17b85159-255d7266-b3b6364-2c7f02 |
| s-0x1-000000000005-15-17b85159-255d7266-b3b6364-2ca7ea |
| s-0x1-000000000005-15-2e1b30b9-6c4c41b7-15353b8c-201 |
| s-0x1-000000000005-15-2e1b30b9-6c4c41b7-15353b8c-52e |
| s-0x1-000000000005-15-2e1b30b9-6c4c41b7-15353b8c-4d1 |
| s-0x1-000000000005-15-17b85159-255d7266-b3b6364-29822a |
| s-0x1-000000000005-5-0-24272d6 |
| s-0x1-000000000002-0 |
| s-0x1-000000000005-4 |
| s-0x1-000000000005-b |

*Fig. 4a*

Sub-Hash 160

| | |
|---|---|
| 0 | 00000000000000000000000000000001 |
| 1 | 00000000000000000000000000000010 |
| 2 | 00000000000000000000000000000100 |
| 3 | 00000000000000000000000000000000 |
| 4 | 00000000000000000000000000000000 |
| 5 | 00000000000000000000000000000000 |
| 6 | 00000000000000000000000000000000 |
| 7 | 00000000000000000000000000000000 |
| 8 | 00000000000000000000000000000000 |
| 9 | 00000000000000000000000011011000 |
| a | 00000000000000000000000000000000 |
| b | 00000000000000000000000000000000 |
| c | 00000000000000000000000000000000 |
| d | 00000000000000000000000100100000 |
| e | 00000000000000000000000000000000 |
| f | 00000000000000000000000000000000 |

Sub-Hash 162

| | |
|---|---|
| 0 | 00000000000000000000000000000010 |
| 1 | 00000000000000000000000000000101 |
| 2 | 00000000000000000000000000000000 |
| 3 | 00000000000000000000000000000000 |
| 4 | 00000000000000000000000000000000 |
| 5 | 00000000000000000000000000000000 |
| 6 | 00000000000000000000000000000000 |
| 7 | 00000000000000000000000000011000 |
| 8 | 00000000000000000000000001100000 |
| 9 | 00000000000000000000000010000000 |
| a | 00000000000000000000000000000000 |
| b | 00000000000000000000000000000000 |
| c | 00000000000000000000000000000000 |
| d | 00000000000000000000000100000000 |
| e | 00000000000000000000000000000000 |
| f | 00000000000000000000000000000000 |

Fig. 4b

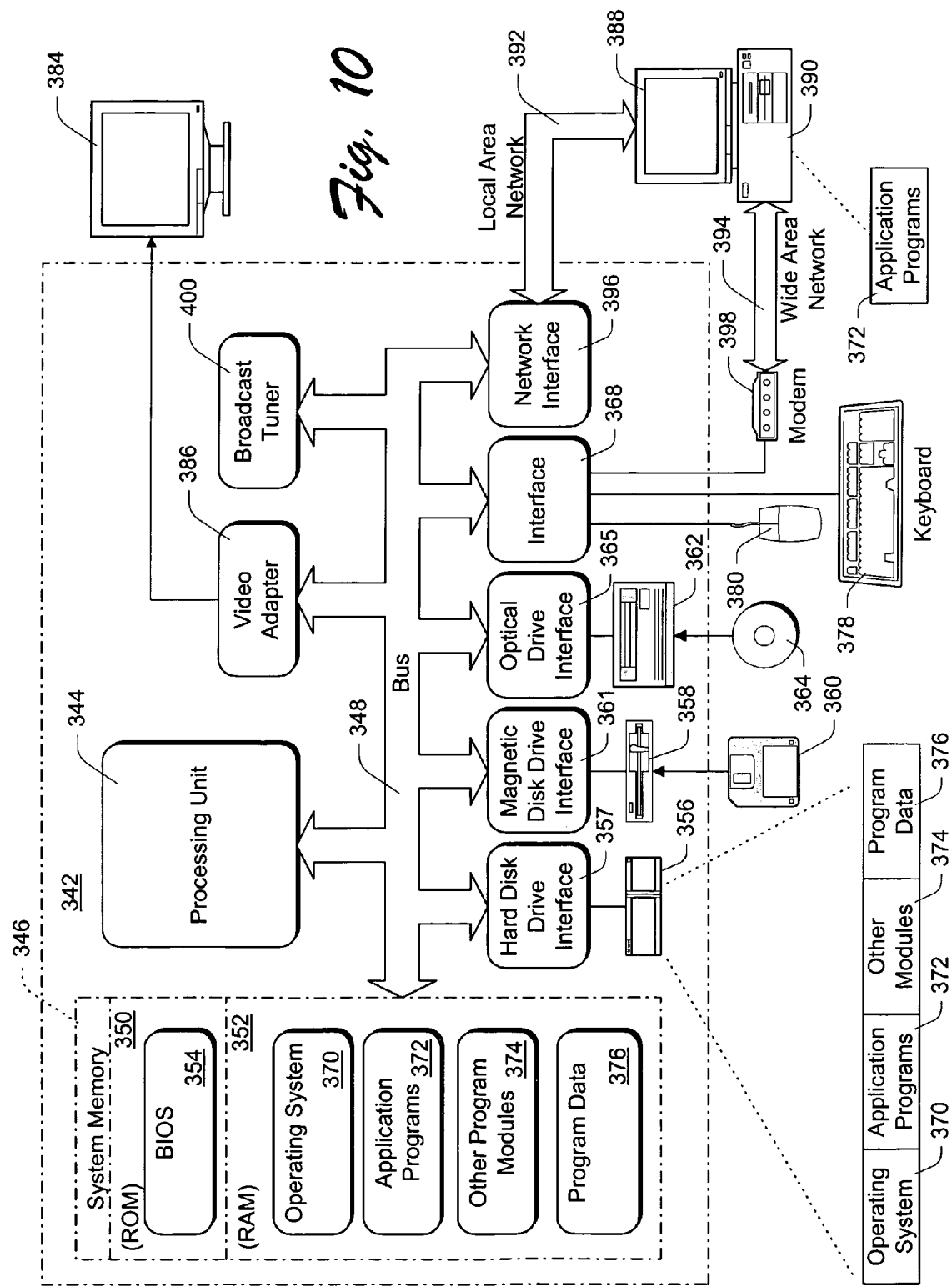

HASHING USING MULTIPLE SUB-HASHES

TECHNICAL FIELD

This invention relates to hashing, and more particularly to hashing using multiple sub-hashes.

BACKGROUND OF THE INVENTION

As computer technology has advanced, so too has the need for security within computers. One popular type of security incorporated into computers, typically through the operating system, is user-based restrictions on the various objects in the computer (e.g., hardware resources, software components, etc.). Each user of a computer system has one or more corresponding identifiers, and each object has one or more rules that define access rights (e.g., which users can access the object and how they can access it).

FIG. 1 illustrates an example of a current access control system. Each object in the computer system has a corresponding access control list (ACL) 100 that is made up of multiple (m) access control elements (ACEs) 102 that each include a security identifier (SID) 104. Additionally, each user has a list of multiple (n) SIDs 106. When the user desires to access the object, the SIDs 106 are compared to the SIDs 104 to determine whether any of the SIDs 106 match any of the SIDs 104. If a match exists then the user can access the object (subject to any other access limitations identified in the ACE). However, if no match exists then the user cannot access the object.

However, in the system illustrated in FIG. 1, to compare the SIDs 106 with the SIDs 104, a linear search through all m SIDs 104 for each of the n SIDs 106 may be needed, requiring a large number of operations (that is, m×n operations). Such a large number of operations can adversely affect the performance of the computer system. This performance drain is only exacerbated by the fact that such comparisons are typically required each time a new object is accessed (which can be quite frequently). Thus, it would be beneficial to provide an improved way to perform such comparisons.

One solution to reduce the number of such comparisons would be to use hashing to determine which comparisons to make. To use hashing, a hash key would be generated from each of the SIDs in the ACL. This hash key would then be used as an index into a hash table to identify a value from the hash table that indicates, based on the hash key, which SIDs corresponding to the user are likely matches. One problem with this solution, however, is the memory storage requirements. The hash table would require $2^b$ locations, where b represents the number of bits in the hash key. The memory storage requirements can thus grow quite large, especially as the size of the hash key increases and the amount of data stored in each location of the hash table increases. Large memory storage requirements can reduce the performance of the comparison process (counteracting the benefits of hashing) due to memory page faults in systems employing virtual memory.

The invention described below addresses these disadvantages, providing an improved hashing structure using multiple sub-hashes.

SUMMARY OF THE INVENTION

Improved hashing using multiple sub-hashes is described herein.

According to one aspect, a hashing structure including multiple sub-hashes is used to determine whether an input value matches one or more of multiple target values. A hash key is obtained from the input value and multiple sub-hash indexes (one for each of the multiple sub-hashes) are generated based on the key. Values are identified from the multiple sub-hashes by indexing into the sub-hashes using respective ones of the sub-hash indexes. These values are then combined to generate a resultant hash value. Each of the multiple target values corresponds to one of multiple portions of the resultant hash value. If the portion corresponding to one of the target values has a particular value (e.g., one), then that target value is a likely match and is compared to the input value to determine if indeed the two match. This comparison can then be repeated for each target value with a corresponding portion in the resultant hash value that has the particular value.

According to another aspect, in a computer system where each user has a security token that identifies the user's ability to access objects in the computer system, multiple sub-hashes are used to determine whether one or more security identifiers of a user's security token match a security identifier of an access control entry corresponding to an object in the computer system. Multiple such determinations may be made depending at least in part on the number of security identifiers in the access control entry. The determination is made by selecting a number of bits from the access control security identifier to use as a hash key. The hash key is separated into multiple (e.g., two) portions, each portion being used to index into a sub-hash. Values are identified in the sub-hashes based on the indexing, and the identified values are bitwise logically AND'd together to generate a hash result. Each one of the security token security identifiers corresponds to a bit in the hash result. For each bit in the hash result, if the bit is set (e.g., has a value of one) then the corresponding security token security identifier is a likely match and that security token security identifier is compared to the access control security identifier; however, if the bit is not set (e.g., has a value of zero) then the corresponding security token security identifier is not a likely match and no such comparison need be made.

BRIEF DESCRIPTION OF THE DRAWINGS

The present invention is illustrated by way of example and not limitation in the figures of the accompanying drawings. The same numbers are used throughout the figures to reference like components and/or features.

FIGS. 4a and 4b illustrate an example of the usage of the multiple sub-hash structure to compare security identifiers.

FIG. 10 illustrates an example of a suitable operating environment in which the invention may be implemented.

DETAILED DESCRIPTION

An improved hashing structure using multiple sub-hashes is described herein. The improved hashing structure generates multiple sub-hash indexes based on a hash key, and uses these indexes to index into the sub-hashes. The values obtained by indexing into the sub-hashes are then combined to generate a resultant hash value.

Figure 1:
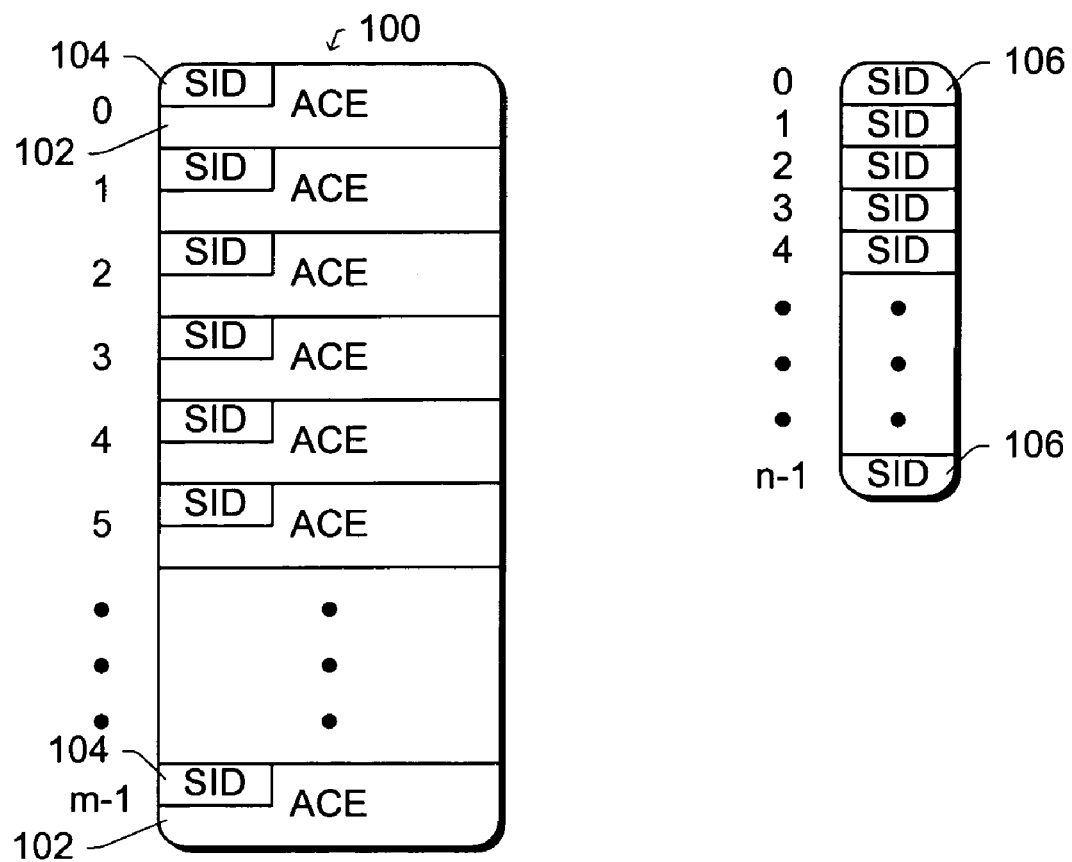
FIG. 1 illustrates an example of a current access control system.
Figure 2:
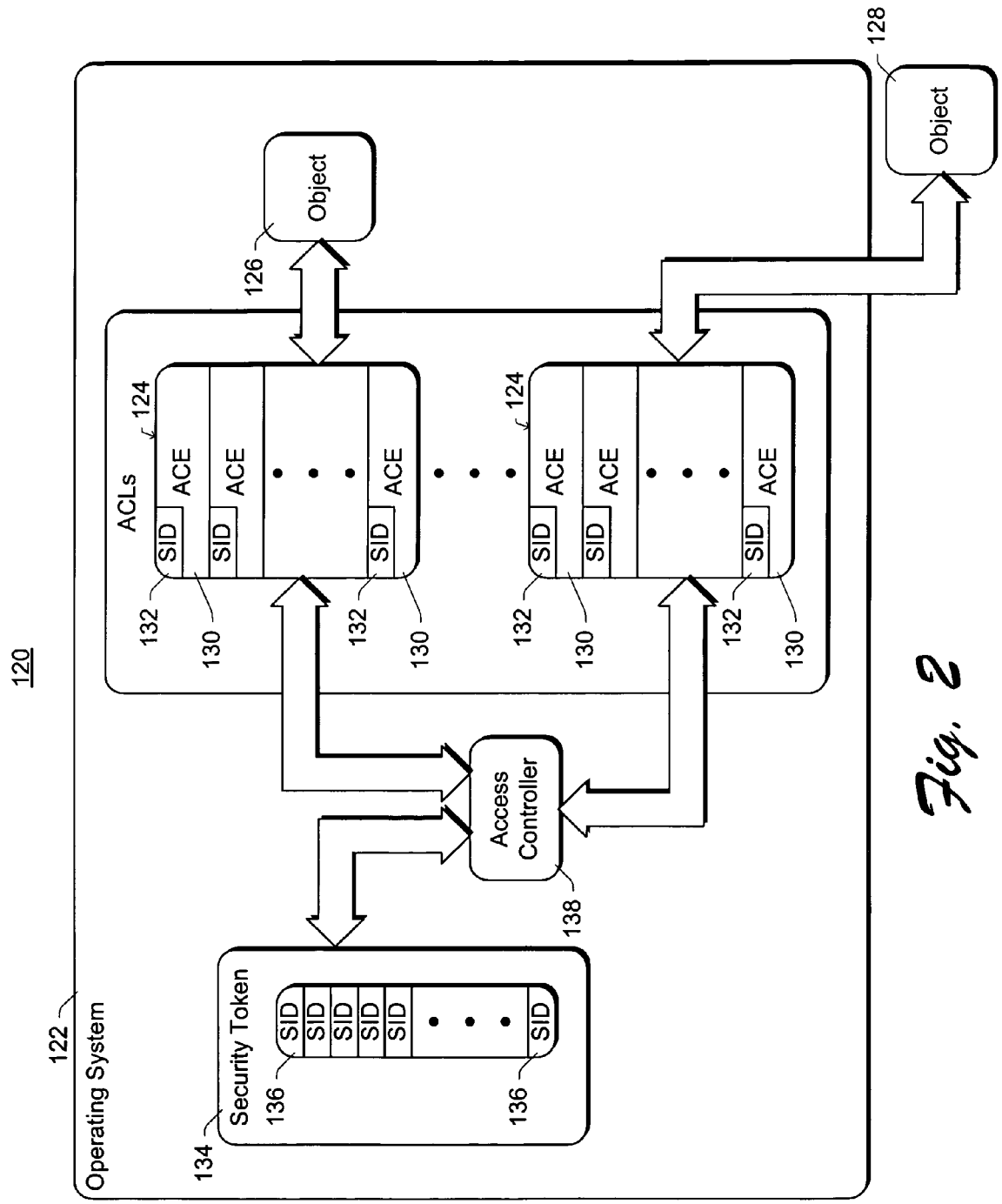
FIG. 2 illustrates an exemplary system in which the improved hashing structure can be used.

FIG. 2 illustrates an exemplary system in which the improved hashing structure can be used. In the exemplary computer system 120 of FIG. 2, an operating system 122 implements access control lists (ACLs) 124 to control access to multiple objects 126 and 128. Objects 126 and 128 refer to system files or resources that can be operated on or accessed, such as application files, data files, communication endpoints (network locations), running processes, etc. The objects can be part of the operating system 122 (e.g., object 126) or alternatively external to the operating system 122 (e.g., object 128) but operating under the control of the operating system 122. Object 128 may be executing on computer system 120 or alternatively executing on some remote system being accessed by computer system 120 (e.g., via a network such as the Internet). Although only two objects 126 and 128 are illustrated in FIG. 2, any number of objects may be included in computer system 120 (or some other remote system(s)).

Each user of computer system 120 is assigned a particular identifier, typically referred to as his or her "user name". Operating system 122 further allows each user to belong to multiple different groups, thereby allowing access control restrictions to be imposed by group. For example, a particular user "Joe" may belong to the groups "Marketing" and "Distribution", but not to the groups "Accounting" or "Management".

Operating system 122 includes an access control list 124 for each of the objects 126 and 128. Each ACL includes one or more access control elements (ACES) 130 that identify a particular user or group of one or more users that can (or alternatively cannot) access the corresponding object 126 or 128. This identification of a user or group of users is contained in the security identifier (SID) 132 of the ACE 130. By way of example, one object may have a corresponding ACL that indicates only the "Admin" user can access the object, while another object may have a corresponding ACL that indicates the users "SallyB" and "JoeC" can access the object as well as any user that belongs to the group "Marketing".

Operating system 122 further maintains, for each user, a security token 134 that includes multiple security identifiers 136. Additional information (not shown) corresponding to the user may also be included in the user's security token. Although only one security token 134 is illustrated in FIG. 2, operating system 122 may include numerous security tokens (e.g., one for each user with access to computer system 120). Security token 134 includes a security identifier 136 for the user's individual user name as well as each of the groups (if any) the user is part of.

When a user requests to access an object 126 or 128, an access control component 138 compares the SIDs 136 of the user's security token 134 to the SIDs 132 of the ACL 124 corresponding to the requested object. If any one of the SIDs 136 of the user's security token 134 matches any one of the SIDs 132 of the ACL 124 corresponding to the requested object, then the user's ability to access the object may be limited (subject possibly to other matching SIDs for the user) in accordance with an access mask contained within the ACE 130 that includes the matching SID 132. The access mask contained within an ACE 130 identifies the types of accesses to the object that are allowed by that ACE (e.g., read, write, open, close, etc.), and the types of accesses identified in the access masks can vary by object. The access mask of the ACE 130 can thus be compared to the type of access being requested by the user to determine whether the ACE 130 will allow the access. The use of ACLs and security tokens to perform access control is well-known. However, a novel and improved hashing structure, described in more detail below, is used by operating system 122 in determining whether any of the SIDs 136 matches any of the SIDs 132.

The improved hashing structure is described herein primarily with reference to an access control system. However, the invention is not limited to use in implementing access control or to use within an operating system. The improved hashing structure described herein can be used in any of a wide variety of locations, including many of those where conventional hashing structures currently exist. By way of example, the improved hashing structure described herein can be used with an operating system object manager (e.g., the Windows® NT object manager) to look up an object from its name, with a local security authority (LSA) to look up the locally unique value of a loadable privilege name, for the LSA to determine if a specific SID is in a SID cache, for the LSA to map a name to a SID, for the LSA to look up a trusted domain object (TDO) from a TDO list, etc.

Figure 3:
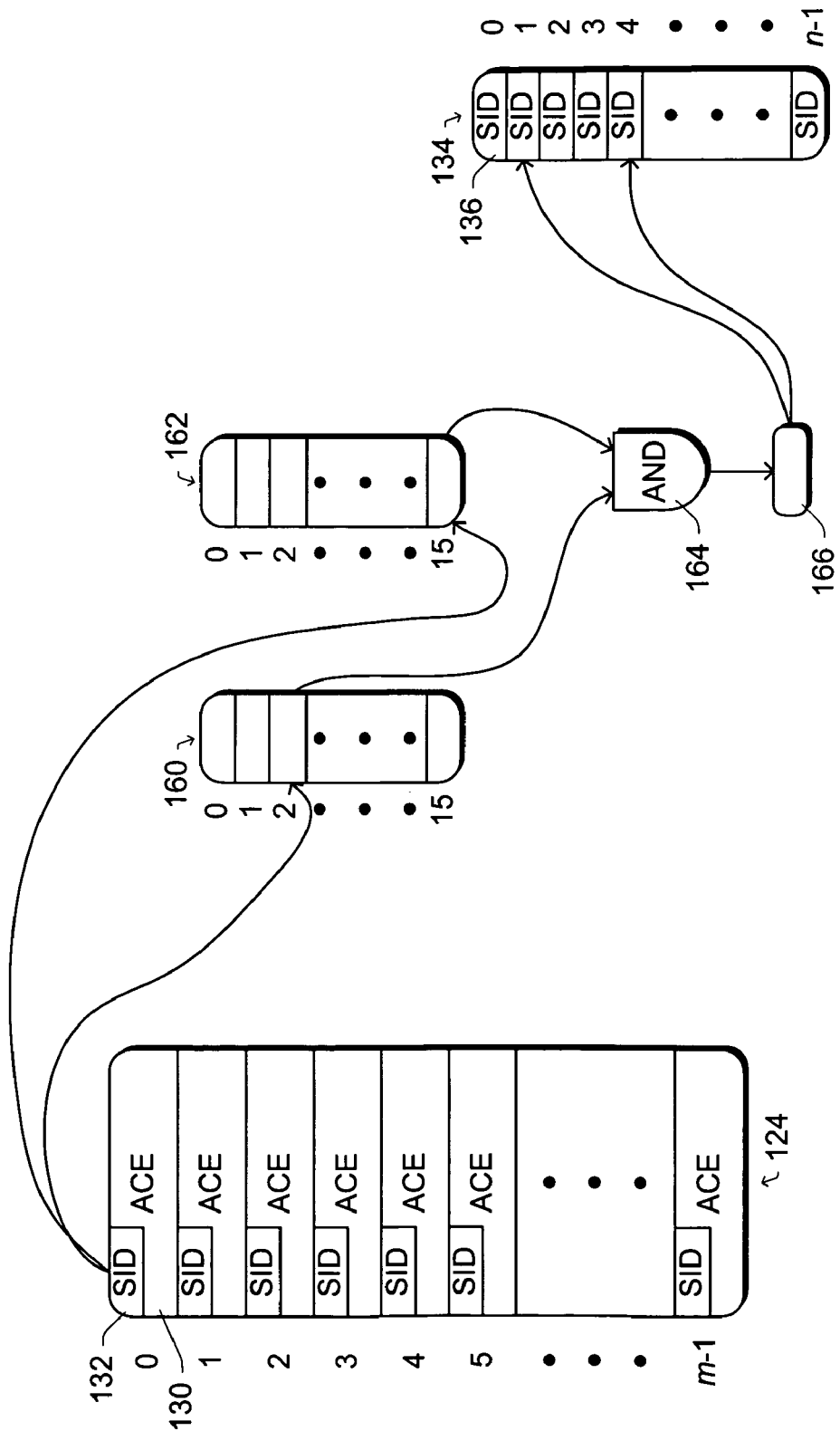
FIG. 3 is a block diagram illustrating the improved hashing structure in accordance with certain embodiments of the invention.

FIG. 3 is a block diagram illustrating the improved hashing structure in accordance with certain embodiments of the invention. An access control list 124 corresponding to a particular object (not shown) and a security token 134 corresponding to a particular user are shown in FIG. 3. To determine whether the access control SID 132 of an ACE 130 matches any of the security token SIDs 136 of the security token 134, a hash key is generated from the SID 132. The hash key can be generated in any of a wide variety of conventional manners, and in one implementation is generated by using the least significant byte of the last sub-authority (also referred to as the relative ID or RID) of the SID 132 as the hash key.

This hash key is then separated into multiple portions (also referred to as sub-hash indexes or sub-hash keys), one portion for each sub-hash in the structure. In the illustrated example, the structure includes two sub-hashes 160 and 162, so the hash key is separated into two portions. The hash key can be separated in any of a wide variety of manners, and in one implementation is separated into equal contiguous portions (e.g., two adjacent four-bit portions in the event of an eight-bit hash key, one referred to as the high (h) portion (including the four most significant bits of the hash key), and the other referred to as the low (l) portion (including the four least significant bits of the hash key)). These h and l portions are then used as an index into the sub-hashes 160 and 162, respectively. For example, if the h portion of the hash key has a value of 2, then the third location of sub-hash 160 is identified by the portion, and if the l portion has a value of 15, then the last location of sub-hash 162 is identified by the portion.

Each location in the sub-hashes 160 and 162 contains a multiple-bit value, each bit corresponding to one of the security token SIDs 136. The number of bits in each location can vary, but should be at least equal to a maximum number of SIDs 136 that may be in a user's security token 134. The value of each bit in a sub-hash value identifies whether the corresponding security token SID 136 is a likely match to the access control SID 132 based on the sub-hash index. In one implementation, if the four bits of the sub-hash index are the same as (that is, match) the corresponding four bits of the security token SID 136, then the corresponding bit in the sub-hash value is set (e.g., has a value of one); otherwise, the corresponding bit in the sub-hash value is not set (e.g., has a value of zero).

The sub-hash values located at these indexed locations are then input into combinatorial logic, which is a logical AND component 164 in the illustrated example. The logical AND component 164 performs a bitwise logical ANDing of the values received from sub-hashes 160 and 162, and outputs a hash result 166. The hash result 166 identifies those security token SIDs 136 that are likely matches to the access control SID 132 based on the combined results of hashing into sub-hashes 160 and 162. Those security token SIDs 136 that are likely matches can then be compared to the access control SID 132 to determine whether indeed they do match.

The use of multiple sub-hashes quickly creates a hash result in a memory-efficient manner. By hashing the access control SID 132 the number of comparisons of the access control SID 132 to security token SIDs 136 can be greatly reduced. Additionally, by using sub-hashes the amount of memory required to perform the hashing can be greatly reduced over more traditional hashing structures. For example, assume that security token 134 may include up to 32 SIDs 136, so each sub-hash value in sub-hashes 160 and 162 is a 32-bit value. Further assume that the hash key generated from access control SID 132 is an 8-bit hash key, and that sub-hashes 160 and 162 each include 16 locations. Thus, the memory required to store each sub-hash 160 and 162 is 512 bits (16×32), for a total of 1024 bits for both sub-hashes. In contrast, if a traditional hashing structure were to be used, then the hash would require 256 locations ($2^8$) for an 8-bit hash key, resulting in a memory requirement of 8192 bits to store the traditional hashing structure.

The contents of the sub-hashes 160 and 162 are determined by the operating system (e.g., operating system 122 of FIG. 2) based on the security token SIDs 136. In one implementation, the contents of the sub-hashes are stored as part of the user information on the computer, allowing them to be loaded each time a user logs on to the computer. Alternatively, the contents of the sub-hashes may be regenerated each time they are needed. Additionally, the contents of the sub-hashes are recalculated by the operating system whenever the security token 134 is modified (e.g., SIDs 136 being added to or removed from security token 134).

The contents of each location in a sub-hash are calculated based on both the location and the security token SIDs 136. To generate the value to store in a particular sub-hash location, the index number of that location (e.g., zero through fifteen in FIG. 3) is compared to the bits of each security token SID 136 corresponding to that sub-hash. For each security token SID 136, if the index number is the same as the corresponding bits of the security token SID 136, then the corresponding bit at that location is set to one, otherwise the corresponding bit at that location is set to zero. For example, assume that the hashing is based on the least significant byte of the last sub-authority of the SIDs and the first security token SID 136 ends in the eight bits of "01100000". Then, for sub-hash 160 the first bit of the value in the first location (index number zero) would be zero (because the value $0110_2$ does not equal zero), while for sub-hash 162 the first bit of the value in the first location (index number zero) would be one (because the value $0000_2$ does equal zero).

Combinatorial logic 164 is illustrated as a logical AND component. Alternatively, other types of combinatorial logic may be used and the values in sub-hashes 160 and 162 generated accordingly. For example, combinatorial logic 164 may be a logical NOR component, and bits of the values in sub-hashes 160 and 162 generated by being cleared (a value of zero) if the corresponding security token SID 136 is a likely match and being set (a value of one) if the corresponding security token SID 136 is not a likely match.

Additionally, although only two sub-hashes 160 and 162 are illustrated in FIG. 3, more sub-hashes can be included. However, care should be taken in selecting the number of sub-hashes because although using additional sub-hashes can reduce memory requirements, it also increases the number of operations that need to be performed (that is, an additional indexing operation needs to be performed for each additional sub-hash, and additional operations may also need to be performed by combinatorial logic 164).

Furthermore, although the sub-hash values are described as being two equal and contiguous portions of the hash key generated from the access control SID 132, the sub-hash indexes may be generated in different manners. For example, the sub-hash indexes may be of different sizes, or the odd bits of the hash key may be used as one sub-hash index and the even bits of the other hash key used as the other sub-hash index.

In addition, comparisons using the multiple sub-hashing structure illustrated in FIG. 3 may alternatively be performed in the opposite direction. That is, the security token SIDs 136 may be used to generate a hash key from which sub-hash indexes are identified and sub-hashes 160 and 162 accessed to determine which access control SIDs 132 are likely matches.

FIGS. 4a and 4b illustrate an example of the usage of the multiple sub-hash structure to compare security identifiers. In FIG. 4a, multiple access control SIDs 132 are illustrated along with multiple security token SIDs 136. The SIDs 132 and 136 are illustrated in hexadecimal format. The comparison process for one of the access control SIDs 180 will now be discussed.

The hash key for the access control SID 180 is generated by taking the least significant byte of the last sub-authority of SID 180, which is the value $97_{16}$. The hash key is separated into two equal contiguous portion, each being four bits, which results in the sub-hash indexes of $9_{16}$ (for the h portion) and $7_{16}$ (for the l portion).

Two sub-hashes 160 and 162 are illustrated in FIG. 4b, each having sixteen locations and populated with 32-bit values. The first sub-hash index ($9_{16}$) is used as an index into sub-hash 160, resulting in the value "00000000000000000000000011011000" from index location 9, while the second sub-hash index ($7_{16}$) is used as an index into sub-hash 162, resulting in the value "00000000000000000000000000011000" from index location 7. These two values from the sub-hashes 160 and 162 are bitwise logically AND'd together to generate the hash result value: "00000000000000000000000000011000". This hash result value indicates that the fourth and fifth security token SIDs 136 (SIDs 182 and 184) are likely matches to the access token SID 180. The fourth security token SID 182 is then compared to the access token SID 180 and the determination made that the two SIDs do not match (they are not the same). The fifth security token SID 184 is then compared to the access token SID 180 and the determination made that the two SIDs do match (they are the same).

Figure 5:
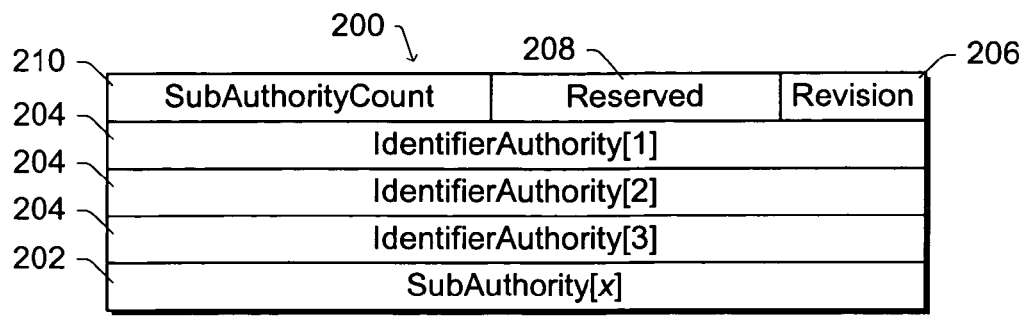
FIG. 5 illustrates an exemplary security identifier structure.
Figure 6:
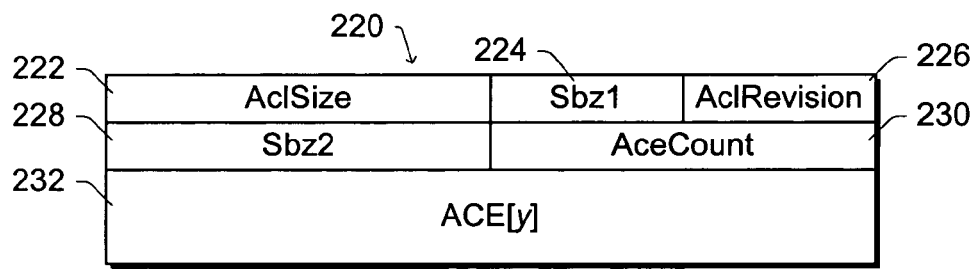
FIG. 6 illustrates an exemplary access control list structure.
Figure 7:
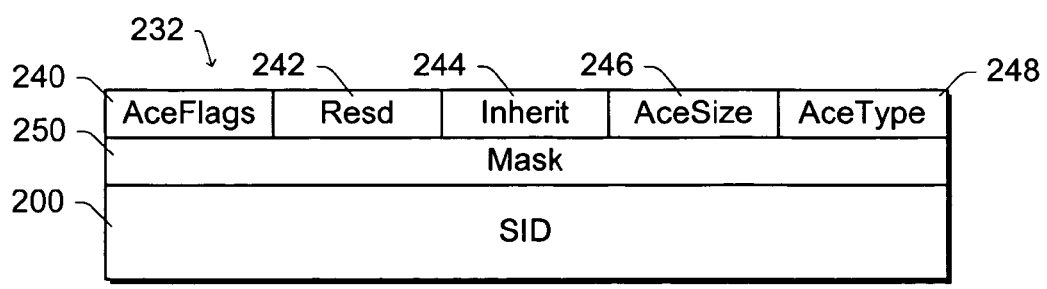
FIG. 7 illustrates an exemplary access control element structure.

The SIDs 132 and 136 can be implemented using any of a wide variety of structures. FIGS. 5, 6, and 7 illustrate exemplary structures for a SID, an ACL, and an ACE, respectively. These structures illustrated in FIGS. 5, 6, and 7 are intended as merely examples of the way such structures may be implemented, and alternatively they may be implemented using different formats.

FIG. 5 illustrates an exemplary SID structure. The SID 200 includes zero or more (x) subauthority fields 202 that identify the trustee that the SID corresponds to (e.g., the user name or user group), three identifier authority fields 204 that identify one or more agencies that issued that SID (e.g., a world authority, a local authority, an operating system authority, etc.), a revision field 206 that identifies the revision number of the SID, a reserved field 208, and a subauthority count field that identifies the number of subauthority fields 202 in the SID 200. In one implementation, the hash key generated from a SID 200 (as well as the bits used to populate sub-hashes 160 and 162 of FIG. 3) is the eight least significant bits of the last (the xth) subauthority field 202. Alternatively, the hash key could be generated based on other bits of the SID 200.

FIG. 6 illustrates an exemplary ACL structure. The ACL 220 includes an AclSize field 222 that identifies the size (in bytes) allocated for the ACL 220, an Sbz1 field 224 that provides padding to align the AclRevision field 226 on a particular boundary (e.g., 16-bit), an AclRevision field 226 that identifies the current revision of the ACL structure, an Sbz2 field 228 that provides padding to align the ACL 220 on a particular boundary (e.g., 32-bit), and an AceCount field 230 that identifies the number (y) of ACEs 232 in the ACL 220.

FIG. 7 illustrates an exemplary ACE structure. The ACE 232 includes an AceFlags field 240 that includes one or more flags specific to the type of ACE, a Resd field 242 that is reserved, an Inherit field 244 that identifies whether the ACE is inherited from a parent object, an AceSize field 246 that identifies the size (in bytes) allocated for the ACE 232, an AceType field 248 that identifies the type of ACE (e.g., using an access allowed structure, an access denied structure, etc.), a mask field 250 that is an access mask associated with the ACE 232 (identifying one of: access allowed, access denied, audit, or alarm), and a SID 200.

Figure 8:
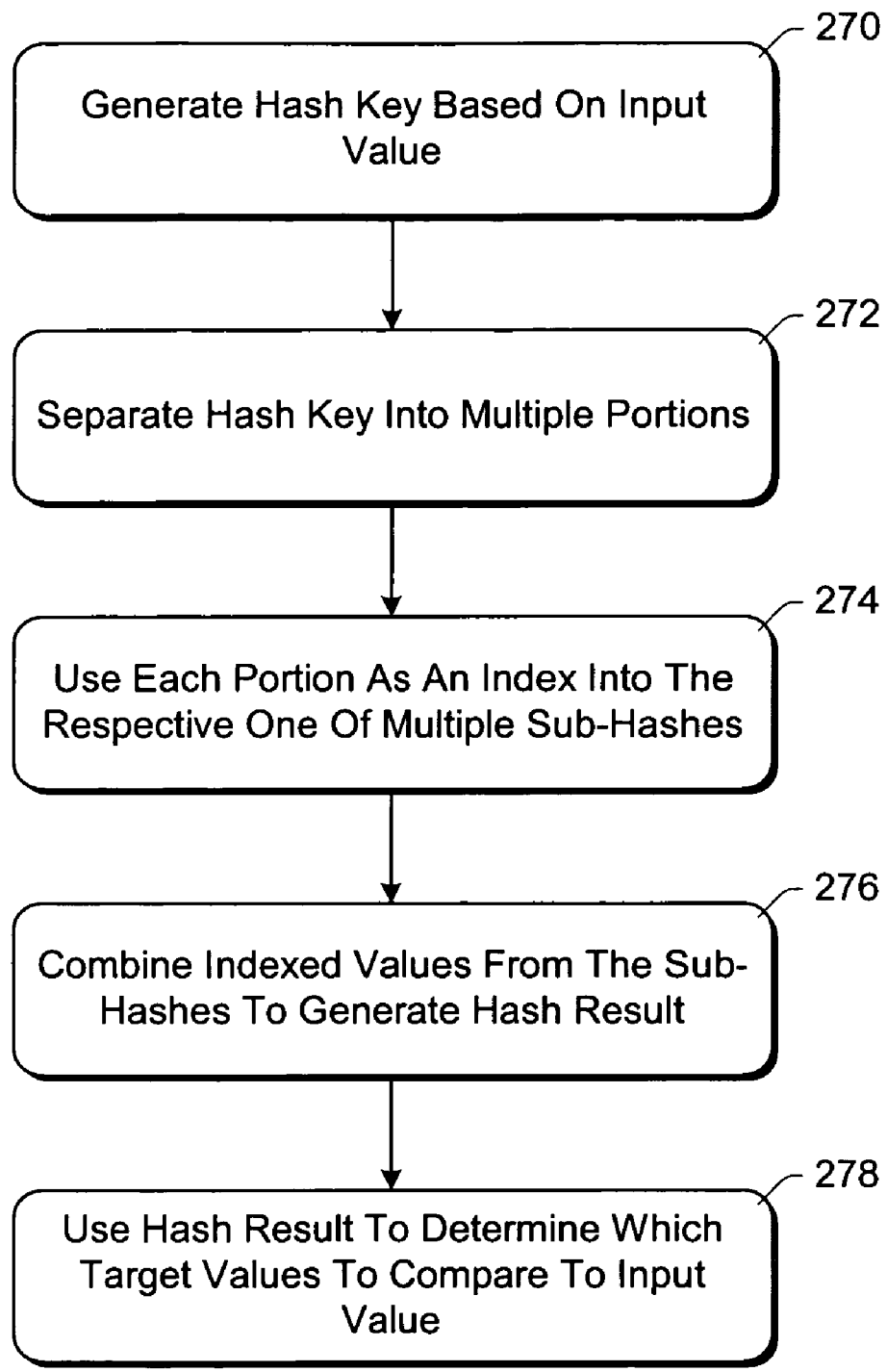
FIG. 8 is a flowchart illustrating an exemplary process for comparing an input value to multiple target values using multiple sub-hashes in accordance with certain embodiments of the invention.

FIG. 8 is a flowchart illustrating an exemplary process for comparing an input value to multiple target values using multiple sub-hashes in accordance with certain embodiments of the invention. The process of FIG. 8 may be implemented in software, such as by access controller 138 of FIG. 2.

Initially, a hash key based on an input value is generated (act 270). The hash key is then separated into multiple portions (act 272), and each portion is used as an index into one of multiple sub-hashes (act 274). The indexed values in the multiple sub-hashes are then combined to generate a hash result (act 276), and the hash result used to determine which of multiple target values are likely matches to the input value and should be compared to the input value (act 278).

Figure 9:
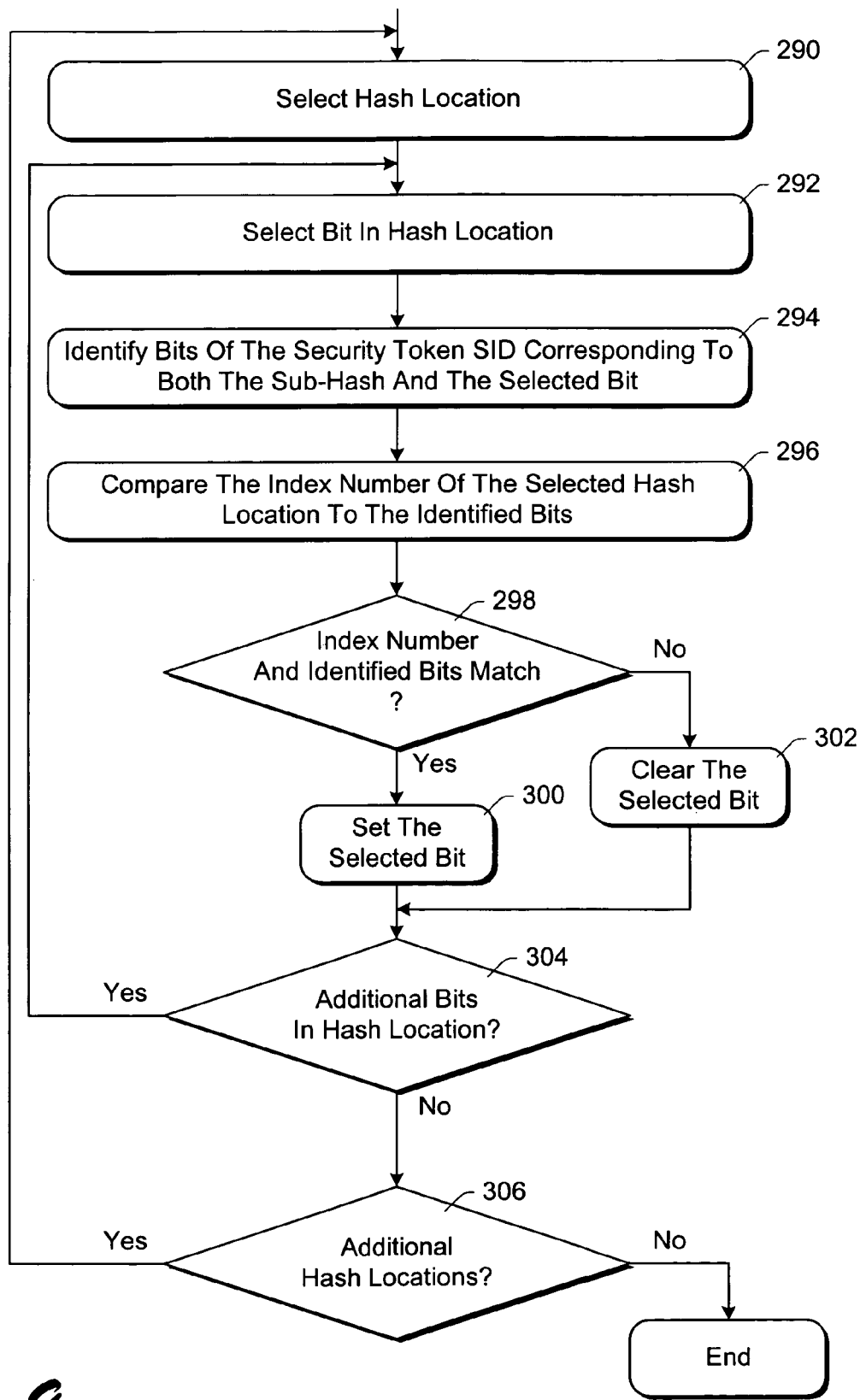
FIG. 9 is a flowchart illustrating an exemplary process for populating a sub-hash in accordance with certain embodiments of the invention.

FIG. 9 is a flowchart illustrating an exemplary process for populating a sub-hash in accordance with certain embodiments of the invention. The process of FIG. 9 may be implemented in software, such as by access controller 138 of FIG. 2. The process of FIG. 9 is repeated for each sub-hash to be populated.

Each sub-hash includes multiple hash locations, and each hash location contains multiple bits each corresponding to one of the security token SIDs. Initially, one of the hash locations is selected (act 290) and one of the bits within that hash location is selected (act 292). For the security token SID corresponding to the selected bit, the bits of the security token SID corresponding to the sub-hash are then identified (act 294). The bits identified in act 294 are then compared to the index number of the selected hash location (act 296), and a determination made as to whether they match (act 298). If the identified bits and the index number match, then the bit selected in act 292 is set (act 300); otherwise, the bit is cleared (act 302).

A check is then made as to whether there are additional bits in the selected hash location that have not yet been set or cleared by the process of FIG. 9 (act 304). If there are additional bits, then the process returns to act 292 to select another bit. If there are no additional bits, then a check is made as to whether there are any additional hash locations with bits that have not yet been set or cleared by the process of FIG. 9 (act 306). If there are additional hash locations, then the process returns to act 290 to select a new hash location; otherwise, the process ends.

FIG. 10 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

FIG. 10 shows a general example of a computer 342 that can be used in accordance with the invention. Computer 342 is shown as an example of a computer in which the improved hashing of the invention can be practiced, such as by running operating system 122 of FIG. 2. Computer 342 includes one or more processors or processing units 344, a system memory 346, and a bus 348 that couples various system components including the system memory 346 to processors 344.

The bus 348 represents one or more of any of several types of bus structures, including a memory bus or memory controller, a peripheral bus, an accelerated graphics port, and a processor or local bus using any of a variety of bus architectures. The system memory 346 includes read only memory (ROM) 350 and random access memory (RAM) 352. A basic input/output system (BIOS) 354, containing the basic routines that help to transfer information between elements within computer 342, such as during start-up, is stored in ROM 350. Computer 342 further includes a hard disk drive 356 for reading from and writing to a hard disk, not shown, connected to bus 348 via a hard disk drive interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from and/or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 360, optical disk 364, ROM 350, or RAM 352, including an operating system 370 (e.g., operating system 122 of FIG. 2), one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus (e.g., a serial port interface, a parallel port interface, a universal serial bus (USB) interface, etc.). A monitor 384 or other type of display device is also connected to the system bus 348 via an interface, such as a video adapter 386. In addition to the monitor, personal computers typically include other peripheral output devices (not shown) such as speakers and printers.

Computer 342 operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 10. The logical connections depicted in FIG. 10 include a local area network (LAN) 392 and a wide area network (WAN) 394. Such networking environments are commonplace in offices, enterprise-wide computer networks, intranets, and the Internet. In certain embodiments of the invention, computer 342 executes an Internet Web browser program (which may optionally be integrated into the operating system 370) such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other means for establishing communications over the wide area network 394, such as the Internet. The modem 398, which may be internal or external, is connected to the system bus 348 via a serial port interface 368. In a networked environment, program modules depicted relative to the personal computer 342, or portions thereof, may be stored in the remote memory storage device. It will be appreciated that the network connections shown are exemplary and other means of establishing a communications link between the computers may be used.

Computer 342 also includes a broadcast tuner 400. Broadcast tuner 400 receives broadcast signals either directly (e.g., analog or digital cable transmissions fed directly into tuner 400) or via a reception device (e.g., via antenna or satellite dish).

Computer 342 typically includes at least some form of computer readable media. Computer readable media can be any available media that can be accessed by computer 342. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 342. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when executed by one or more processors, causes the one or more processors to perform a method including:

generating a hash key based on an input value;

separating the hash key into a plurality of portions;

indexing into each of a plurality of sub-hashes using one of the plurality of portions, each location in each of the plurality of sub-hashes containing a multiple-bit value, each bit corresponding to one of a plurality of target values;
identifying a plurality of values from the plurality of sub-hashes based on the indexing;
combining the plurality of values to generate a hash result, wherein each bit in the hash result corresponds to one of the plurality of target values;
for each bit in the hash result that is set, comparing the input value to the corresponding target value; and
allowing access based on whether the values match.

2. One or more computer readable media as recited in claim 1, wherein the number of target values in the plurality of target values is equal to the number of bits in the hash result.

3. One or more computer readable media as recited in claim 1, wherein a maximum number of target values in the plurality of target values is equal to the number of bits in the result value.

4. One or more computer readable media as recited in claim 1, wherein a maximum number of target values in the plurality of target values is equal to the number of bits in each of a plurality of locations of the plurality of sub-hashes that can be indexed.

5. One or more computer readable media as recited in claim 1, wherein the separating comprises separating the hash key into two portions.

6. One or more computer readable media as recited in claim 1, wherein the separating comprises separating the hash key into a plurality of contiguous and equal portions.

7. One or more computer readable media as recited in claim 1, wherein the combining comprises performing a bitwise logical ANDing of the plurality of values.

8. A hashing architecture implemented in hardware for determining whether to allow access to an access controlled object, comprising:
a plurality of sub-hashes;
a plurality of sub-hash indexes, each index being generated from a hash key and used to index into one of the plurality of sub-hashes, each location in each of the plurality of sub-hashes containing a multiple-bit value, each bit corresponding to one of a plurality of target values; and
a combiner coupled to receive values from the plurality of sub-hashes based on the plurality of sub-hash indexes, and to generate a hash result by combining the received values; and
a comparator coupled to receive the hash result and to determine which of the plurality of target values to compare to an input value;
compare the input value to at least one of the plurality of target values; and
allowing access based on the comparison.

9. A hashing architecture as recited in claim 8, wherein the combiner comprises a combinatorial logic component to perform a bitwise logical ANDing of the values received from the plurality of sub-hashes.

10. A hashing architecture as recited in claim 8, wherein the hashing architecture is implemented in a computing device.

11. A hashing architecture as recited in claim 8, wherein the plurality of sub-hash indexes are generated by separating the hash key into a plurality of equal portions.

12. A method, comprising:
generating a plurality of sub-hash keys based on a hash key, the hash key being based on an input value;
identifying a plurality of values from a plurality of sub-hashes by indexing into each of the plurality of sub-hashes using one of the plurality of sub-hash keys, each location in each of the plurality of sub-hashes containing a multiple-bit value, each bit corresponding to one of an plurality of target values;
generating a hash result based on the plurality of values;
determining based on the hash result which of the plurality of target values to compare to the input value;
comparing the input value to at least one of the plurality of target values; and
allowing access based on the comparison.

13. A method as recited in claim 12, further comprising generating the hash key prior to generating the plurality of sub-hash keys.

14. A method as recited in claim 12, wherein the generating the plurality of sub-hash keys comprises separating the hash key into a plurality of equal portions.

15. A method as recited in claim 12, wherein the generating the hash result comprises performing a bit-by-bit logical ANDing of the plurality of values.

16. One or more computer readable media storing a computer program that is executable by a processor to perform the method recited in claim 12.

17. One or more computer readable storage media having stored thereon a plurality of instructions that, when executed by one or more processors, cause the one or more processors to perform a method including:
generating a hash key based on an access control element security identifier;
separating the hash key into a first portion and a second portion;
indexing into a first sub-hash using the first portion to identify a first sub-hash value;
indexing into a second sub-hash using the second portion to identify a second sub-hash value;
combining the first sub-hash value and the second sub-hash value to generate a result value, wherein each bit in the result value corresponds to one of a plurality of security token security identifiers; and
for each bit in the result value that is set,
comparing the access control element security identifier to the corresponding security token security identifier; and
allowing access based on whether the access control security identifier matches the corresponding security token identifier.

18. One or more computer readable media as recited in claim 17, wherein the generating comprises generating the hash key by selecting a portion of the access control element security identifier.

19. One or more computer readable media as recited in claim 17, wherein the separating comprises separating the hash key into two portions that include an equal number of bits and that are contiguous.

20. One or more computer readable media as recited in claim 17, wherein the combining comprises bitwise ANDing together the first sub-hash value and the second sub-hash value.

21. A method, comprising:
generating a plurality of sub-hash indexes based on a hash key, the hash key being based on an input security identifier;
indexing into each of a plurality of sub-hashes using a respective one of a plurality of sub-hash indexes, each location in each of the plurality of sub-hashes containing a multiple-bit value, each bit corresponding to one of a plurality of target security identifiers;

generating a result hash value by combining a plurality of values resulting from indexing into the plurality of sub-hashes, wherein each of the plurality of target security identifiers corresponds to a portion of the result hash value;

comparing the input security identifier to at least one of the plurality of target security identifiers that corresponds to a portion of the result hash value having a particular value; and allowing access based on whether the input security identifier matches one or more of the plurality of target security identifiers.

22. A method as recited in claim 21, wherein the particular value comprises a value of one.

23. A method as recited in claim 21, wherein each portion is a bit of the result hash value.

24. A method as recited in claim 21, wherein the generating a plurality of sub-hash indexes comprises:
   selecting a portion of the input security identifier;
   separating the portion into two equal and contiguous sub-portions; and
   using each of the sub-portions as one of the plurality of sub-hash indexes.

25. A method as recited in claim 21, wherein the generating the result hash value comprises generating the result hash value by performing a bitwise logical ANDing of the plurality of values.

26. A method as recited in claim 21, wherein the input security identifier comprises an access control security identifier and each of the plurality of target security identifiers comprises a security token security identifier.

27. A method as recited in claim 21, wherein the input security identifier comprises a security token security identifier and each of the plurality of target security identifiers comprises an access control security identifier.

28. One or more computer readable media storing a computer program that is executable by a processor to perform the method recited in claim 21.

29. A computer-based system comprising:
   a plurality of security token security identifiers corresponding to a user;
   a plurality of access control security identifiers corresponding to an object;
   a plurality of sub-hashes, each location in each of the plurality of sub-hashes containing a multiple-bit value, each bit corresponding to one of a plurality of target security identifiers; and
   an access controller to determine whether any of the plurality of security token security identifiers match any of the plurality of access control security identifiers by, for each of the plurality of access control security identifiers,
      generating a plurality of sub-hash indexes based on a hash key,
      indexing into each of the plurality of sub-hashes using a respective one of the plurality of sub-hash indexes,
      identifying a plurality of values from the plurality of sub-hashes based on the indexing,
      combining the plurality of values to generate a hash result value, wherein each bit in the hash result value corresponds to one of the plurality of security token security identifiers, and
      for each bit in the result value that is set,
         comparing the access control security identifier to the corresponding security token security identifier to determine whether the values match; and
         allowing the user access to the object based on whether the values match.

30. A system as recited in claim 29, wherein the plurality of sub-hashes comprise two sub-hashes.

31. A system as recited in claim 29, wherein each bit in the result value that is set has a value of one.

32. A system as recited in claim 29, wherein the combining comprises bitwise logically ANDing together the plurality of values.

33. A system as recited in claim 29, wherein each of the plurality of values and the hash result value each includes a number of bits equal to a maximum number of security token security identifiers that can be included in the plurality of security token security identifiers.

34. A system as recited in claim 29, wherein the system comprises an operating system.

35. A system as recited in claim 29, wherein the system comprises a resource manager that is not a part of an operating system.

36. A method, comprising:
   for each sub-hash in a plurality of sub-hashes that can be used together to generate a hash result for determining whether an input value matches a target value, wherein each location in each of the plurality of sub-hashes contains a multiple-bit value, each bit corresponding to one of a plurality of target values,
      (a) identifying a bit in a location of the sub-hash,
      (b) identifying, in a source value, a plurality of bits corresponding to the sub-hash,
      (c) comparing an identifier of the location to the plurality of bits,
      (d) setting the bit if the identifier of the location matches the plurality of bits, and otherwise clearing the bit, and
      (e) repeating acts (a), (b), (c), and (d) for each of a plurality of bits in the location of the sub-hash; and
   allowing access based on whether the input value matches the target value.

37. A method as recited in claim 36, wherein the plurality of bits correspond to part of a portion of the source value that will be used to generate a hash value.

38. One or more computer readable media storing a computer program that is executable by a processor to perform the method recited in claim 36.

* * * * *